(12) United States Patent
Frensch

(10) Patent No.: US 8,279,205 B2
(45) Date of Patent: Oct. 2, 2012

(54) SYSTEM FOR IMPROVING THE SUBJECTIVE IMPRESSION OF A DIGITIZED IMAGE

(75) Inventor: Jochen Frensch, Villengen-Schwenningen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1262 days.

(21) Appl. No.: 11/359,649

(22) Filed: Feb. 21, 2006

(65) Prior Publication Data

US 2007/0035531 A1    Feb. 15, 2007

(30) Foreign Application Priority Data

Feb. 21, 2005    (EP) ..................................... 05003701

(51) Int. Cl.
*G09G 5/00*    (2006.01)
(52) U.S. Cl. ......................................... 345/204; 341/143
(58) Field of Classification Search .................. 341/143; 345/204
See application file for complete search history.

(56) References Cited

U.S. PATENT DOCUMENTS

| | | | |
|---|---|---|---|
| 4,600,937 A * | 7/1986 | Kudo et al. .................... | 348/555 |
| 4,652,905 A * | 3/1987 | Lippel ........................... | 348/472 |
| 4,965,668 A * | 10/1990 | Abt et al. ...................... | 348/574 |
| 5,250,948 A * | 10/1993 | Berstein et al. ............... | 341/131 |
| 5,525,984 A * | 6/1996 | Bunker .......................... | 341/131 |
| 5,809,414 A * | 9/1998 | Coverdale et al. ............. | 455/421 |
| 5,850,257 A * | 12/1998 | Sakata ........................... | 348/241 |
| 6,040,876 A * | 3/2000 | Pettitt et al. .................... | 348/624 |
| 6,304,091 B1 * | 10/2001 | Shahoian et al. .............. | 324/662 |
| 6,448,912 B1 * | 9/2002 | Berezin ......................... | 341/131 |
| 7,015,843 B2 * | 3/2006 | Jelonnek ....................... | 341/143 |

FOREIGN PATENT DOCUMENTS

| EP | 1 137 266 A2 | 9/2001 |
|---|---|---|
| EP | 1 322 113 A1 | 6/2003 |

OTHER PUBLICATIONS

Roberts, Lawrence Gilman, "Picture Coding Using Pseudo-Random Noise", *IRE Transactions on Information Theory*, Feb. 1962, pp. 145-154.

* cited by examiner

*Primary Examiner* — Amare Mengistu
*Assistant Examiner* — Vinh Lam

(57) ABSTRACT

A system improves the subjective impression of a digitized image displayed with a low amplitude resolution. The system digitizes an analog video signal with a first amplitude resolution. Before the amplitude resolution of the video signal is reduced to a second, lower amplitude resolution, the system adds a digital noise signal to the digital video signal. The maximum amplitude of the added digital noise signal is about equal to or smaller than the amplitude corresponding to the least significant bit of the second resolution.

13 Claims, 7 Drawing Sheets

SYSTEM FOR IMPROVING THE SUBJECTIVE IMPRESSION OF A DIGITIZED IMAGE

BACKGROUND OF THE INVENTION

1. Priority Claim

This application claims the benefit of priority from European Patent Application No. 05003701.9, filed Feb. 21, 2005, which is incorporated by reference.

2. Technical Field

The present invention relates to digital signal processing. In particular, the invention relates to a system for improving the subjective quality of an image that has been digitized.

3. Related Art

Due to their relatively low cost, liquid crystal displays (LCD) are used in a wide range of applications. LCDs can be found in personal computers, personal digital assistants, television sets, cellular phones, vending machines, camcorders, digital cameras, automobiles and many other appliances. In some cases the images displayed on LCDs have an analog origin or have been subject to an intermediate analog transmission.

FIG. 1 shows a structure related to displaying video images on a display device such as an LCD. A display apparatus 100 comprises an analog-to-digital converter 102, an image processor 106 and a display 110. An analog video signal is applied to analog video input 101. The analog video signal could be a black and white composite signal, a color composite signal, separate red, green and blue (RGB) signals, or chrominance and luminance signals. The contents of the analog video signals are moving full-video, but in other cases might be still pictures such as photographs, icons or maps.

An A/D converter 102 digitizes the analog video signal with a certain space and amplitude resolution. In case of a composite video signal the A/D converter also separates synchronization signals and synchronizes to them. The A/D converter puts out a digital value for each pixel within an image that is to be displayed. In FIG. 1, each digital value is 24 bits long. Eight bits are dedicated for each of the intensities of the colors red, green and blue. The three different intensity values are symbolized by the three separate connection lines 103, 104, 105. The connection lines 103, 104, 105 provide the pixel values to the image processor 106. The connections shown in FIG. 1 include eight lines per color. This suggests a parallel data connection.

The image processor 106 may be dedicated hardware assembled on a printed circuit board, a dedicated integrated circuit, appropriate software running on a processor such as a digital signal processor or configurable integrated logic circuits. A Field Programmable Gate Array (FPGA) may be employed as the image processor 106. FPGAs may include several function elements including programmable input/output blocks, memory blocks and configurable logic blocks. These functional elements are interconnected by routing channels. An FPGA may be customized by loading configuration data into internal static memory cells. Values stored in such cells determine logic functions and interconnections within the FPGA. Configuration data can be read from an external serial PROM or written into the FPGA from an external master, such as a controller.

In the master mode, the FPGA reads configuration data from an external computer-readable medium such as a mask programmed memory or other non-volatile solid state memory. In the slave mode, an external controller reads configuration data from any computer-readable medium such as a magnetic disk, magnetic tape, optical disk, printed bar code or any kind of solid state memory and writes it into the FPGA.

One task of image processor 106 is to interface the A/D converter 102 and the display 110, as they may have different data formats, different frame rates, different spatial resolution or different amplitude resolution. Image processor 106 may also perform other tasks such as switching between a plurality of different inputs, providing a graphical user interface, or adjusting image parameters such as brightness or contrast. In FIG. 1, display 110 has lower intensity resolution than the ouput of the A/D converter 102. In this case the display has sixteen bit intensity resolution, five bits each for the colors red and blue and six bits for the color green.

In a case such as this, image processor 106 must perform a rounding operation. This may be merely the truncation of the two or three least significant bits from the output values output from the A/D converter. This rounding or truncation operation may cause an indesirable deterioration of the perceived quality of the displayed image.

The degradation of perceived image quality resulting from the rounding or truncation operation may be best understood with reference to FIG. 2. FIG. 2 shows an analog video signal 201. The video signal 201 may be an intensity signal of a black and white video, a luminance signal of a color video or an intensity signal of one of the colors red, green or blue. The signal is constant over the entire time period displayed. Such a signal would correspond, for example, to an area in an image having uniform color and intensity. Curve 202 shows the same signal 201 having an interfering periodic signal superimposed thereon. The interfering periodic signal could be, for example, the hum of a power supply, semiconductor drift, irradiation by RF signals, ripple on the power supply from changing load currents, or the like. When the analog signal 202 is digitized by an A/D converter having the thresholds shown with dashed lines 203 to 205, the digitized signal shown in curve 206 results. Although the signal is depicted as continuous lines in curve 206, it is understood that the signal represents time discrete values corresponding to various the pixels within the image. Due to the fine intensity resolution, a step of one LSB is unlikely to be visible to the human eye. However, because of signal the interferance, the digital signal varies with a peak-to-peak amplitude of two least significant bits (LSBs).

At the ordinate, the four least significant bits of the digital values are shown. In this example the two least significant bits will be truncated in order to obtain six bit resolution necessary for the display values from the eight bit values output from the A/D converter. The result of this truncating operation is depicted in curve 207. Due to the lower resolution, the step created by the interferer in the truncated signal 207 is eight times as high as with the original digital signal. As a result it produces regions of perceivably different color or intensity in an area of originally uniform color or intensity.

The impression created to the eye of an observer is illustrated in FIG. 3. Image 310, the original image, has a circular area of uniform grey, rastered into pixels. Image 312 belongs to curve 207. Image 312 exhibits a contiguous area 302 of perceivably darker color. Depending on the frequency of the interference, the effect on the image may be a contiguous area, horizontal stripes or even complete areas changing the color shading with time from frame to frame or over a plurality of frames.

As the described effects can significantly degrade the quality of the displayed image. Therefore there is a need for a system which reduces the negative effects of reducing the digital resolution of a displayed image.

SUMMARY

The perceived quality of an image displayed on a display device such as an LCD is improved by adding a digital noise signal to the digital video signal obtained from an A/D converter before the digital image signal is rounded or truncated. This prevents the interference signal from causing contiguous regions of an image to be displayed in different colors. The affected region instead shows a randomly rastered intensity without sharp border lines. If the video signal is superimposed with an interferer before its amplitude resolution is reduced the visual appearance of a displayed picture may be improved. In some instances a digital noise signal is generated and is added to the digital video signal. The combined digital video signal and the digital noise signal form a sum signal. Next, the amplitude resolution of the sum signal is reduced in order to obtain a video signal having a second reduced amplitude resolution. The digital noise signal has a maximum amplitude about equal to or smaller than the amplitude corresponding to a least significant bit of the second amplitude resolution.

The analog video signal may be a full-video image. The noise signal may be a random value obtained independently for each pixel of each frame of the video signal, or the noise signal may be a pseudo-random value. The noise signal may be obtained by choosing random or pseudo-random values for all pixels and subjecting the random or pseudo-random values to spatial digital filtering. Alternatively, the random or pseudo-random values of pixels located at identical positions in subsequent frames may be subjected to digital filtering. The noise signal may be stored for one complete image in a memory, and the stored noise signal may be applied to all frames of a video signal. Further, the noise signal may have a peak-to-peak amplitude value equal to the value of the least significant bit of the first amplitude resolution. The analog video signal may be a black and white video signal, a color video signal comprising intensity signals associated with each of a plurality of colors. At least one of the intensity signals may be digitized to obtain a digital video signal having a first amplitude resolution. The system may generate a digital noise signal, add the digital noise signal to the digital video signal, and reduce the amplitude resolution of the sum signal to obtain a video signal with a second amplitude resolution. Alternatively, the analog video signal may be a color video signal comprising of a luminance signal. At least one of the luminance and chrominance signals may be digitized to obtain a digital video signal having a first amplitude resolution, generate a digital noise signal, add the digital noise signal to the digital video signal, and reduce the amplitude resolution of the sum signal to obtain a video signal with a second amplitude resolution are applied. The second amplitude resolution may correspond to 6 bit resolution or less.

The video display includes a digitizing circuit for converting an analog video signal into a digital video signal. The digital video signal has a first amplitude resolution. The video display system further includes a noise generator for producing a digital noise signal, and an adding circuit for adding the digital video signal and the digital noise signal in order to obtain a sum signal. A rounding circuit reduces the amplitude resolution of the sum signal. The rounding circuit generates a second digital video signal having a second amplitude resolution. The maximum amplitude of the digital noise signal is about equal to or smaller than an amplitude corresponding to a least significant bit of the second amplitude resolution. Finally, a display device is provided for displaying images corresponding to the second digital video signal.

The noise generator, the adding circuit, and the rounding circuit may be embodied in a field-programmable gate array (FPGA). Alternatively, the noise generator, the adding circuit, and the rounding circuit may be embodied in a processing unit where the processing unit includes a memory for storing the digital video signal, a memory having instructions stored thereon for causing a processor to generate a digital noise signal. The processing unit may add the digital noise signal to the digital video signal to obtain a sum signal, and reduce the amplitude resolution of the sum signal to obtain a video signal with a second amplitude resolution. In yet another alternative, a computer readable medium is provided having instructions stored thereon which, when executed on a processor, cause the processor to generate a digital noise signal, add the digital noise signal to the digital video signal to obtain a sum signal, and reduce the amplitude resolution of the sum signal to obtain a video signal with a second amplitude resolution.

Finally, a computer-readable medium may be provided having configuration data stored thereon. When the configuration data are loaded into a field-programmable gate array (FPGA) the configuration data configure the field-programmable gate array in a manner such that the FPGA provides a noise generator for producing a digital noise signal, an adding circuit for adding the digital video signal and the digital noise signal to obtain a sum signal; and a rounding circuit for reducing the amplitude resolution of the sum signal to obtain a second digital video signal having a second amplitude resolution.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
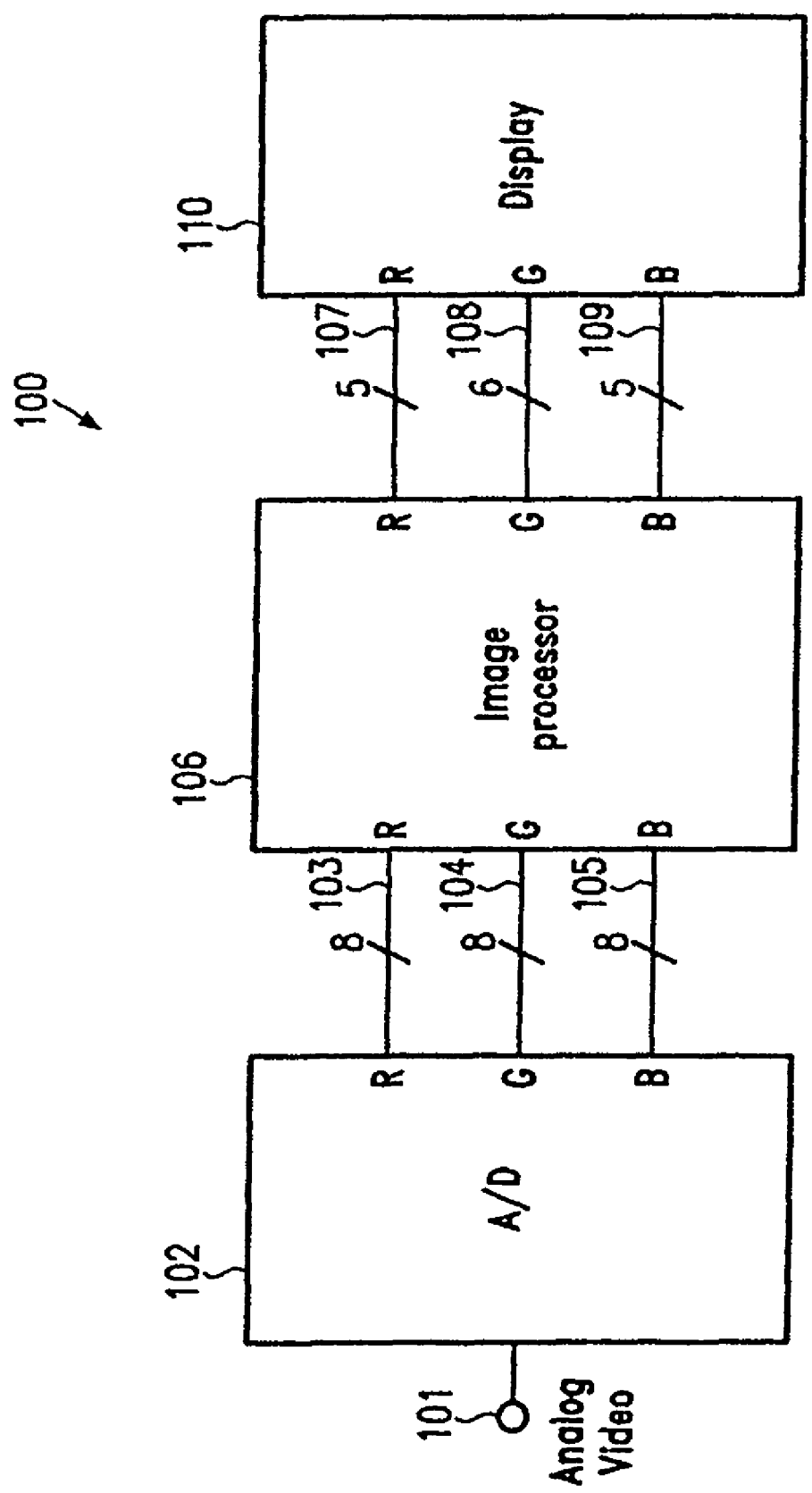
FIG. 1 illustrates an exemplary display.
Figure 2:
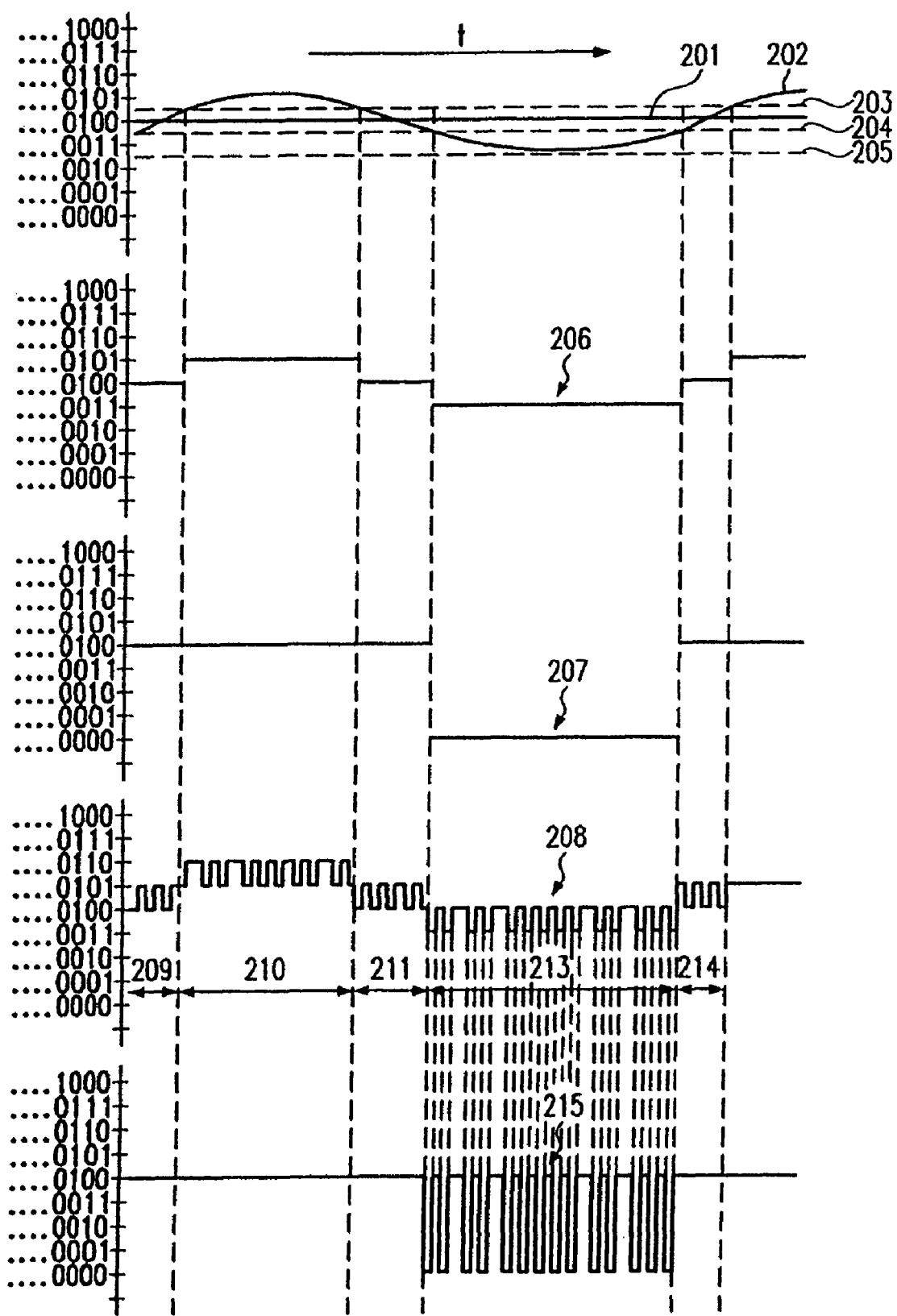
FIG. 2 shows analog and digital video signals.
Figure 3:
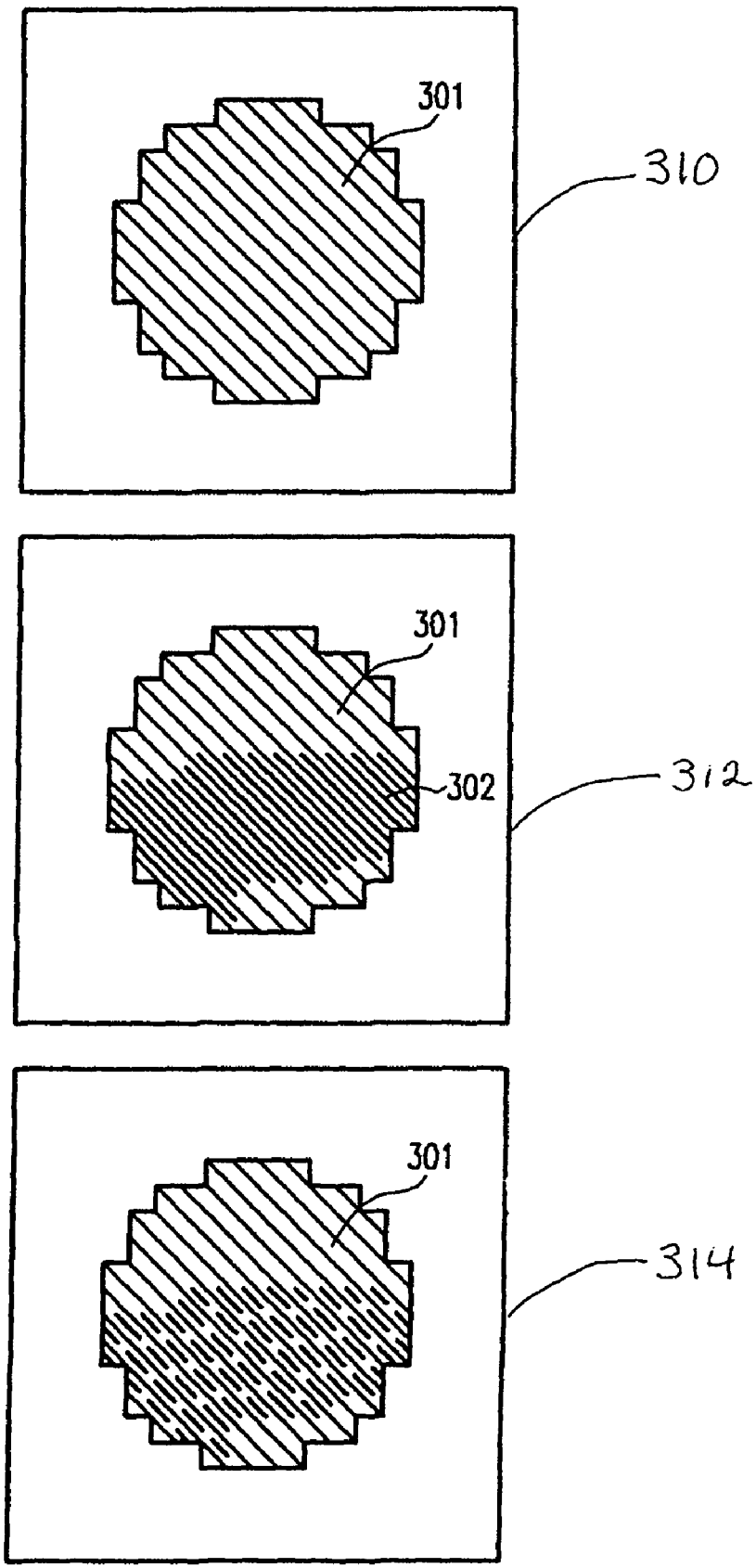
FIG. 3 shows the effect of an interferer on an image.

Referring again to FIG. 2, curve 208 shows the sum of the curve 206 with a digital noise signal. The digital noise signal comprises of arbitrarily selected zeros and ones. The curve 215 shows the curve 208 having the two least significant bits truncated as was done with the curve 206 to arrive at the reduced resolution curve 207. Comparing the curve 215 to curve 207 there is no difference in the portions 209, 210, 211 and 214 of the resulting rounded or truncated curve 215 compared to curve 207. Within portion 213, however, the added noise causes the resulting signal to toggle between two adjacent values. The result on the displayed image is illustrated in image 314 in FIG. 3. Grey area 301 still shows a non-uniform region, but the detrimental effect is significantly reduced when compared to image 312.

Figure 4:
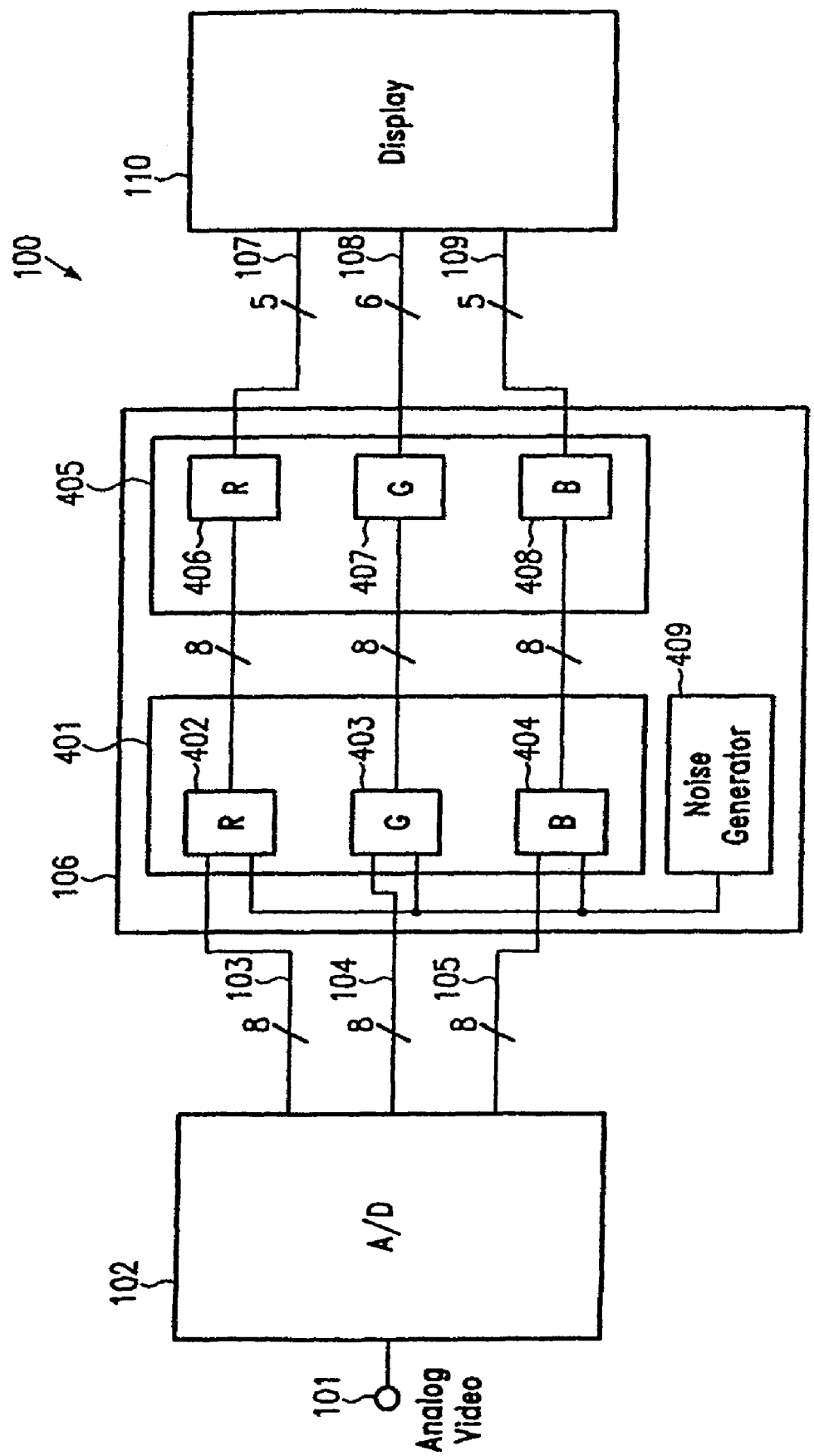
FIG. 4 shows an example structure of a display.

FIG. 4 includes analog video input 101, A/D converter 102 and display 110 and an image processor 1061. In FIG. 4, the image processor 106 includes an adding section 401, a rounding section 405 and a noise generator 409.

Figure 5:
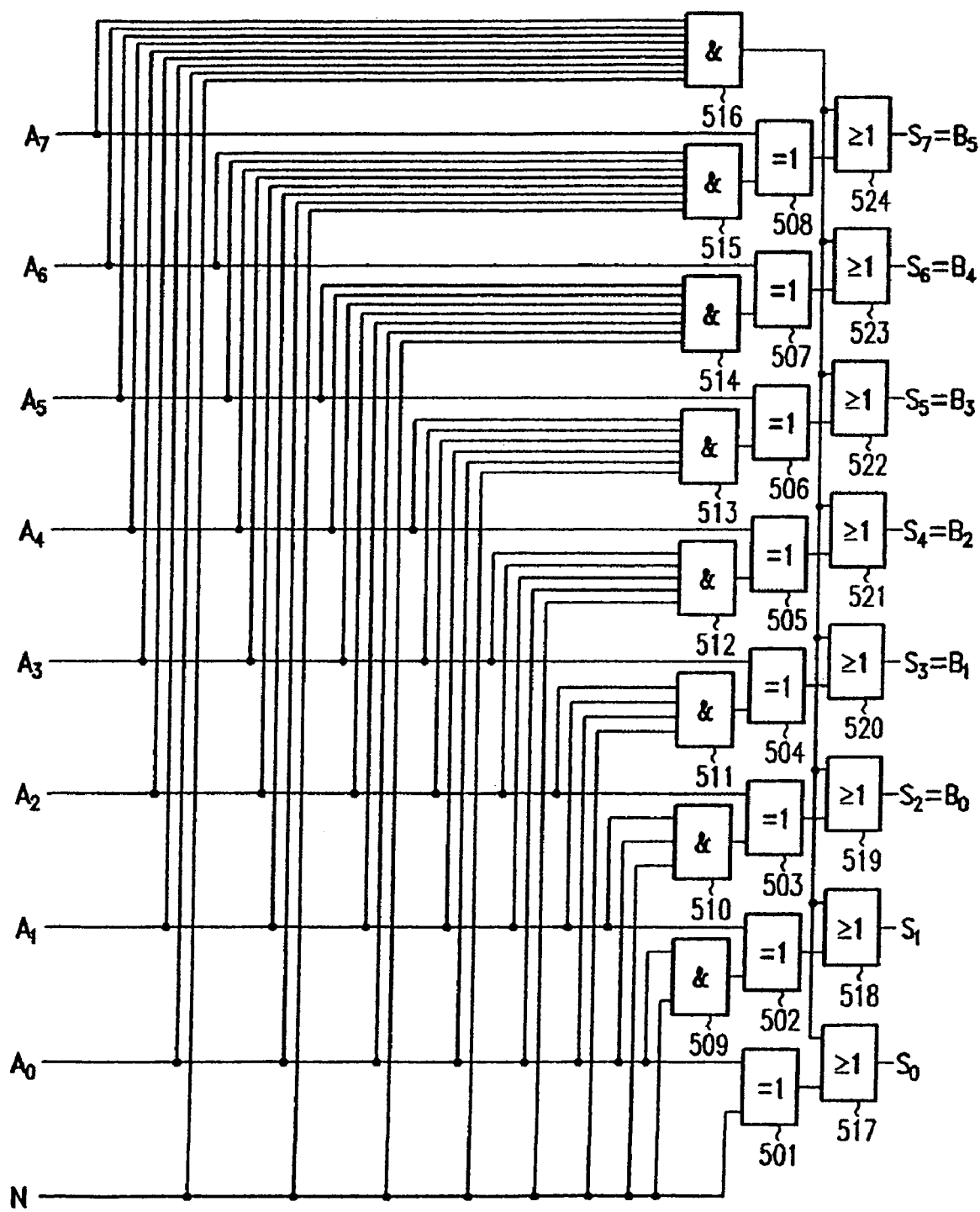
FIG. 5 is an example structure of an adder.

In this system the adding section 401 comprises three adder circuits 402, 403, 404, one for each color. Each adder circuit may be, for example, an eight bit full adder. The eight bit intensity signal of one color is connected to one input of each adder circuit 402, 403, 404 and the digital noise signal is connected to the least significant bit of a second input. An alternative arrangement is shown in FIG. 5. In FIG. 5 the circuitry is y adapted to add one bit to an eight bit value. An Exclusive OR 501 adds the noise bit to the least significant bit of a video signal. AND-gates 509 to 515 combine the carry signal for all remaining bits. The carry is added with Exclusive OR gates 502 to 508. AND-gate 516 detects an overflow for the case that the eight bit value of 255 is added with a noise bit of one. In this case the output value is also set to 255 by the OR-gates 517 to 524. This prevents an inversion of the image in the case of an overflow. Various other implementations for adder circuits 402, 403, 404 are also possible. For example, a look-up table with nine address bits and eight bit output data may be employed.

Returning to FIG. 4, rounding section 405 comprises rounding circuits 406, 407, 408. Again, there is one rounding circuit for each color. In one system, rounding is performed by truncating one or more of the least significant bits from each signal.

Another system combines the adding section 401 and the rounding section 405. In this case, again referring to the adder circuit of FIG. 5, gates 501, 502, 509, 517 and 518 may be omitted, and the output values truncated to the six bits $B_0$ to $B_5$.

Noise generator 409 provides a digital noise signal with the same clock rate as the digital video signal. The digital noise signal may be a one-bit signal, or it may also have a plurality of valid bits. In order to avoid unwanted distortion of the displayed image, the maximum amplitude of the generated digital noise signal is equal to or smaller than an amplitude value corresponding to the least significant bit of the intensity resolution of the display. In other words, with respect to FIG. 2, the second or lower 6 bit resolution.

The digital noise signal is a one-bit signal having a value equal to the bit corresponding to the least significant bit of the first, higher resolution. That is, the noise signal has a peak-to-peak amplitude value about equal to the value of the least significant bit of the first, higher resolution.

Figure 6:
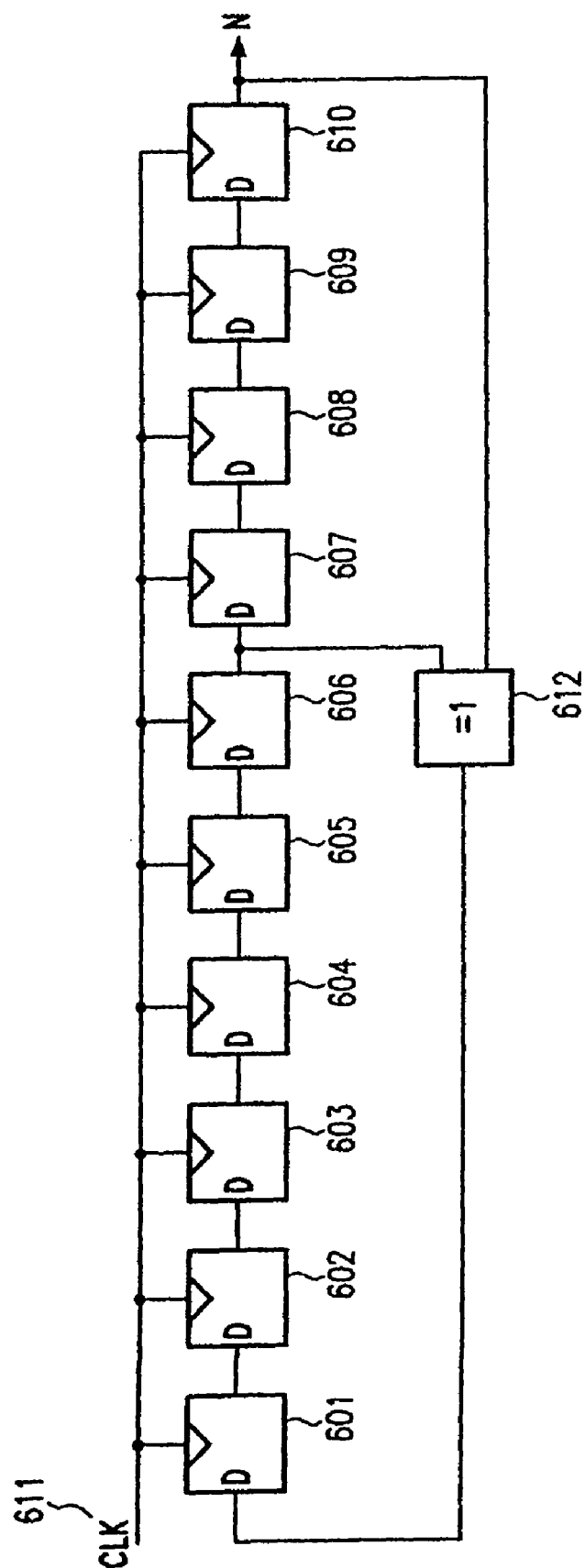
FIG. 6 depicts a possibility to generate a digital noise signal.

One possible implementation of a digital noise generator 409 is depicted in FIG. 6. A plurality of D-flip-flops 601 to 610 clocked by video word clock 611, together with one or more exclusive OR-gates 612, form a linear feedback shift register. Linear feedback shift registers such as that shown in FIG. 6 when properly configured are known to generate a pseudo-random binary sequence which re-occurs after two $2^m-1$ clock cycles (m being the number of flip-flops in the shift register). If the digital noise signal must include more than one bit, additional bits can be obtained from other flip-flop outputs.

Of course other noise generating mechanisms may be employed in place of the linear shift register of FIG. 6. For example, a look-up table may be employed where the look-up table is addressed by a counter which is in turn clocked by the video word clock. In this system the noise structure can be synchronized to the frame rate of the video signal. This results in a raster pattern that does not change from frame to frame. The stable raster pattern avoids creating an impression of additional motion in a video image in areas of uniform color and intensity. In other cases a smoothing of the noise signal over space and/or time may be desired. This can be obtained by appropriate two dimensional filtering over space or by timewise filtering the noise values for each pixel between subsequent frames. The logic shown in FIGS. 5 and 6 may be implemented in dedicated hardware, however, other implementations are possible such as a GAL or Field Programmable Gate Arrays (FPGA).

Figure 7:
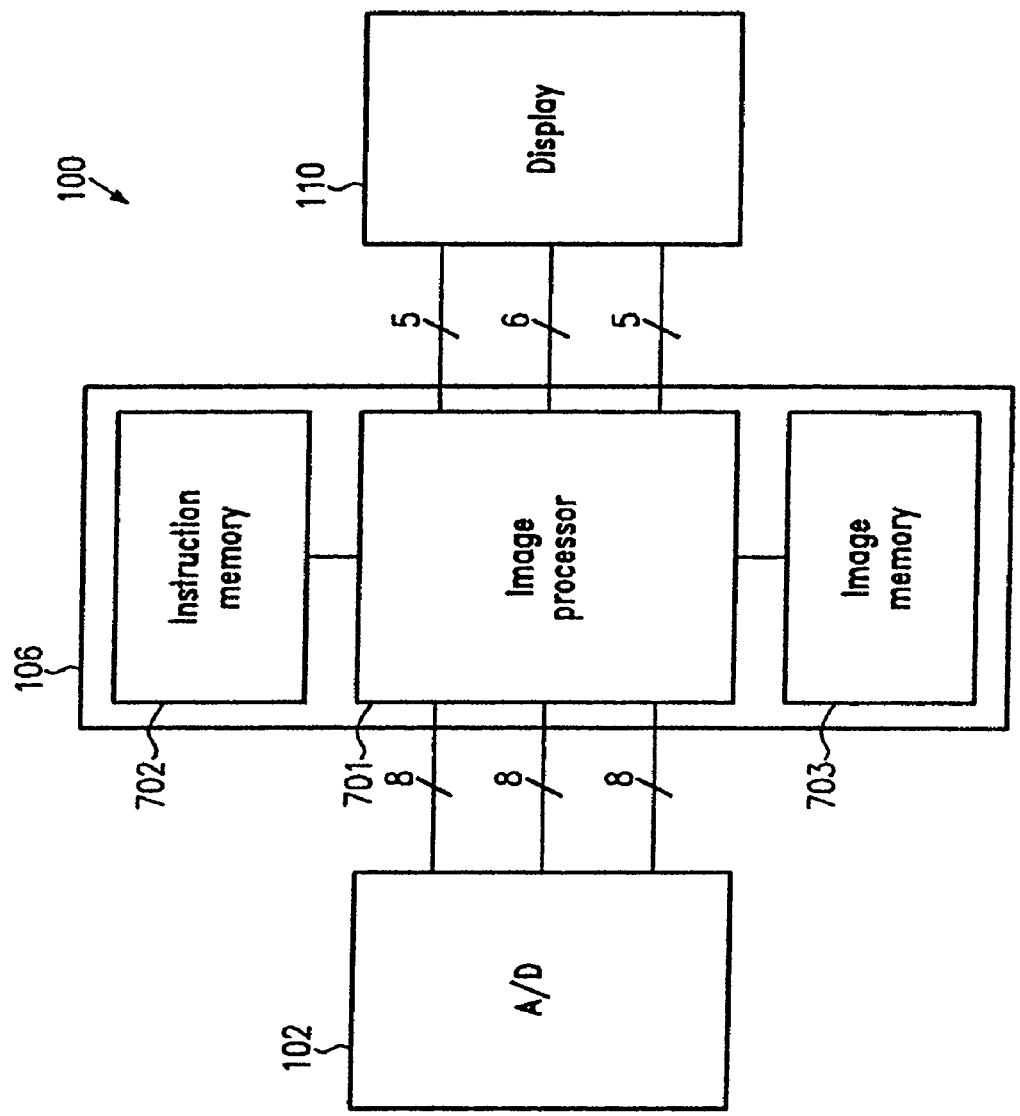
FIG. 7 shows an exemplary structure.

The functions of adding section 401, rounding section 405 and noise generator 409 may be implemented in software running on a processor such as a digital signal processor. Such a structure is depicted in FIG. 7. In this case, the image processor 106 includes processor 701, instruction memory 702 and image memory 703. Instruction memory 702 and image memory 703 may be located in the same physical entity or may be provided separately. Instructions stored on the instruction memory 702 cause the processor 701 to perform the described addition, rounding and noise generation operations.

Instruction memory 702 may be mask programmed, or the instructions may be stored in RAM or a non-volatile memory such flash or EEPROM. In this case the instructions are loaded from any other computer-readable medium such as magnetic tape, magnetic disk, optical disk solid state memory or the like.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A method for improving a subjective impression of a digitized image displayed with a low amplitude resolution, comprising:
    digitizing an analog video signal to obtain a digital video signal having a first amplitude resolution;
    generating a digital noise signal;
    adding the digital noise signal to the digital video signal to obtain a sum signal after digitization of the analog video signal separate from the generation of the digital noise signal; and
    reducing an amplitude resolution of the sum signal to obtain a video signal with a second amplitude resolution, where the digital noise signal having a maximum amplitude about equal to or smaller than an amplitude corresponding to a least significant bit of the second amplitude resolution and is a one-bit signal.

2. The method according to claim 1 where the analog video signal comprises a full-video image.

3. The method according to claim 1 where the noise signal comprises a random value obtained independently for each pixel of each frame.

4. The method according to claim 1 where the noise signal comprises a pseudo-random value.

5. The method according to claim 1 where the noise signal is obtained by choosing random or pseudo-random values for all pixels and subjecting the random or pseudo-random values to spatial digital filtering.

6. The method according to claim 1 where the noise signal is obtained by choosing random or pseudo-random values for all pixels and subjecting the random or pseudo-random values of pixels located at an identical position in subsequent frames to digital filtering.

7. The method according to claim 1 where the noise signal is stored for one complete image in a memory, and the stored noise signal is applied to all frames of said video signal.

8. The method according to one of claim 1 where the noise signal has a peak-to-peak amplitude value about equal to the value of the least significant bit of the first amplitude resolution.

9. The method according to claim 1 where the analog video signal comprises a black and white video signal.

10. The method according to claim 1 where the analog video signal comprises a colored video signal comprising intensity signals associated with each of a plurality of colors, and the method is applied to at least one of said intensity signals.

11. The method according to claim 1 where the analog video signal is a colored video signal comprising a luminance signal and a chrominance signal, and the method is applied to at least one out of said luminance and chrominance signals.

12. The method according to one of the claim 1 where the analog video signal comprises a composite video signal.

13. The method according to claim 1 where the second amplitude resolution corresponds to 6 bit resolution or less.

* * * * *